(No Model.)

F. L. PERRY.
TWO WHEELED VEHICLE.

No. 283,811. Patented Aug. 28, 1883.

Attest:
Courtney A. Cooper
William Barton

Inventor:
F. L. Perry
By Charles E. Foster
Atty

UNITED STATES PATENT OFFICE.

FRANCIS L. PERRY, OF CANANDAIGUA, NEW YORK.

TWO-WHEELED VEHICLE.

SPECIFICATION forming part of Letters Patent No. 283,811, dated August 28, 1883.

Application filed November 7, 1882. (No model.)

*To all whom it may concern:*

Be it known that I, FRANCIS L. PERRY, of Canandaigua, Ontario county, New York, have invented Improvements in Vehicles, of which the following is a specification.

My invention relates to improvements in vehicles, chiefly adapted to those of the sulky class, whereby to secure greater strength in the bodies, reduce the cost of construction, and afford a more comfortable and easy rest for the occupants.

Figure 1:
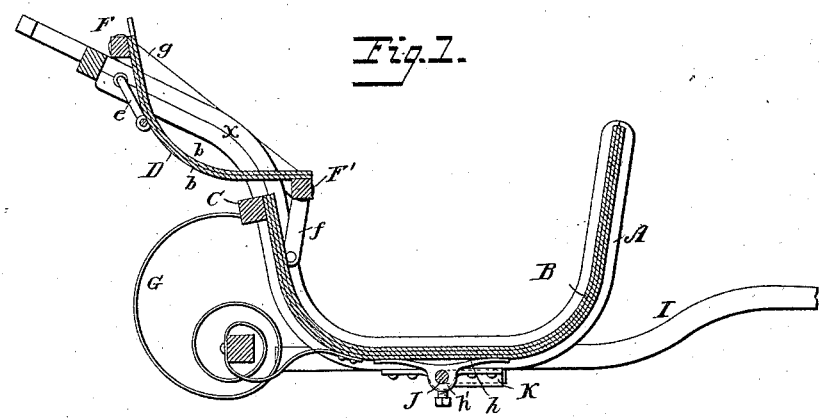
Figures 2, 5:
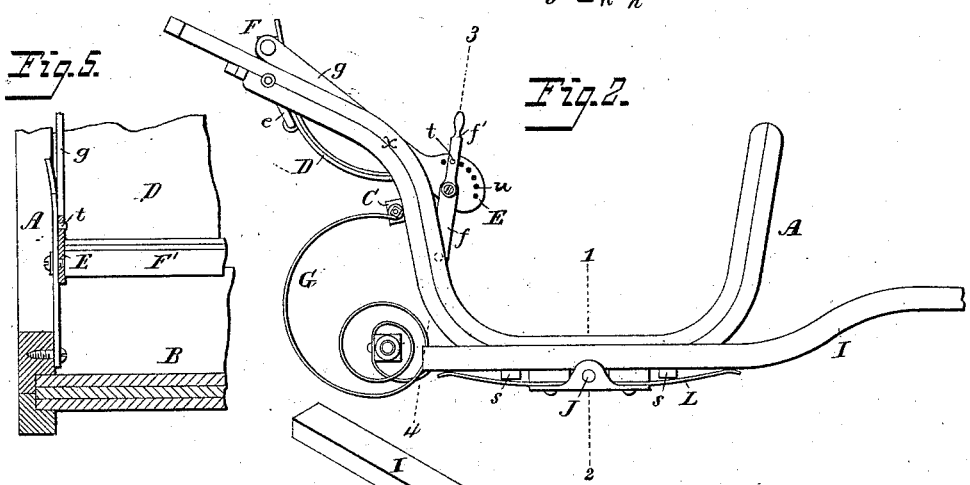
Figure 3:
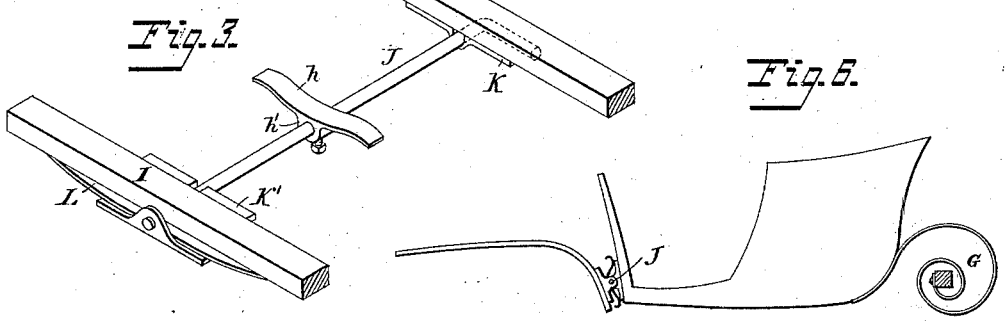
Figure 6:
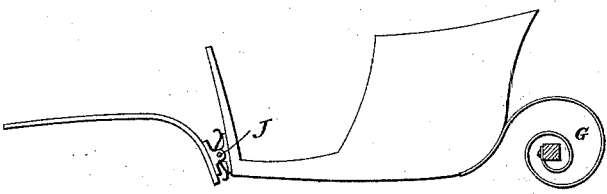
Figure 4:
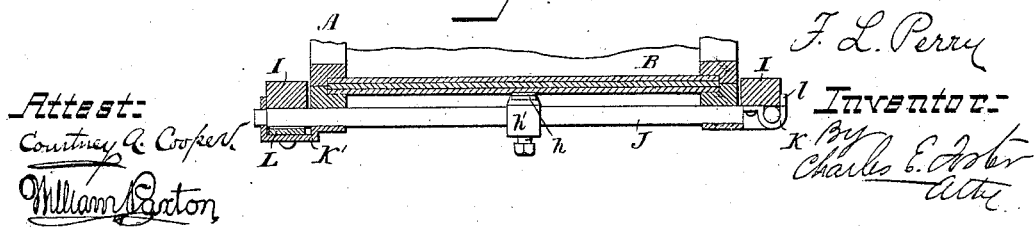

In the drawings, Figure 1 is a sectional elevation of a sulky, showing my improvements. Fig. 2 is a side elevation. Fig. 3 is a perspective view of the shafts and connections. Fig. 4 is an enlarged cross-section on the line 1 2, Fig. 2. Fig. 5 is an enlarged cross-section on the line 3 4, Fig. 2, and Fig. 6 is a modification.

The body portion of the vehicle, instead of consisting of a mortised frame with bottom and panel boards nailed or riveted thereto, as usual, is composed of continuous edge pieces A A, each consisting of a strip of bent wood or two or more strips bolted or riveted together and receiving between them the edges of the panel or bottom piece, B. The edge pieces A, are bent to form the edges of the back, bottom, and dash, thus making a continuous structure. By this means I secure great strength, durability, and cheapness. This construction, while I have shown it in connection with a sulky, is applicable to vehicles of different construction.

The boards B terminate at a cross-rail, c, and the seat D, instead of being fixed, as usual, is supported between the side pieces above the rail c. The seat is suspended from the side pieces at the rear by links e, and is connected at the front by links f, one of which may be extended upward to form a spring-handle, f', having a lug, t, which enters the holes u in a plate, E, at the side of the seat, thereby securing the link and seat together, so as to prevent any swinging of the latter. The handle f' may be pushed out to carry the lug t from the socket to adjust the seat to a different position in which it is locked, when the handle again springs back with the lug in another socket. By this means the angle of the seat to the body may be changed so as to maintain the seat level whatever may be the inclination of the body.

A strong and durable yet simple mode of constructing the seat consists in forming it of overlaid veneers b b, riveted at the front and rear edges to cross-bars F F', connected by tie-strips g, so as to preserve the bent form of the boards b. The side bars or strips, A, between which the seat is hung, may be bent at x, opposite the sides of the seat, so as to form arms therefor, as shown.

While I have shown the seat as suspended by link-connections, it may be otherwise adjustably secured to the body. The plate E may form part of one of the side strips, g. The body rests upon coiled springs G G, secured to the body at the ends and passing once or more times around the axle.

To avoid the constant jolts which result from connecting the shafts directly to the body or to the axle and resting the body thereon, I attach the shafts I I to a cross-rod, J, turning in bearings attached to the body, and connect this rod to the body through the medium of a spring, h, which will permit of a limited rotation of the rod independent of the body, so that slight vibrating movements of the shaft will be taken up by the spring and not imparted to the body. The rod J may be connected to the shafts in any suitable manner. As shown, it is provided with bent ends which are bolted directly to the under sides of the shafts at one side by a covering-plate, K, having a lip, l, to hold the plate K, and at the other side by a bent plate, K', which also affords a bearing for a spring, L, described hereinafter, and holds the rod J in position on body.

The spring h may be secured to a block, h', secured adjustably on the rod J beneath the body, as shown in Figs. 1, 3, and 4, or the rod J may be in front of the dash, as in Fig. 6. By adjusting the block h' greater tension may be put on the spring; and the angle of the shafts may be altered. As the spring h will generally be too light to resist the weight thrown upon it by a person getting in and out of the vehicle, I provide for an increased spring-resistance by interposing a spring, L, at one or both sides between the shafts and the bracket K', upon which spring the shaft takes its bearing when the body is depressed to an unusual extent. Rubber springs or springs of other forms may be substituted for that shown, and rubber pads $s$ may be secured on the shafts above the springs L to deaden sound.

In light vehicles the spring $h$ may be dispensed with, and the rod J may be made of steel, secured in any suitable manner to act of itself as a torsion-spring.

I claim—

1. A vehicle the body-frame of which consists of continuous edged strips A, composed each of two or more strips bolted together and connected to intermediate boards, substantially as set forth.

2. A sulky-body consisting of edged strips A, bent to form a dash, bottom, and side arms, in combination with a seat arranged between the strips, substantially as set forth.

3. The combination, with the body of the sulky, of a seat, D, suspended within said body, and appliances for adjusting the angle of said seat and securing it after adjustment, substantially as specified.

4. The seat consisting of the bent-board portion, edge strips F F', and the bars $g$, suspended adjustably to the body by links $e\ f$, arranged and connected to the side strips, A, substantially as specified.

5. The combination, with the suspended seat, of the perforated plate E, and the links $f\ f'$, having a lug, $t$, for the purpose set forth.

6. The combination of the body, shafts, rod J, spring $h$, and adjustable block $h'$, substantially as set forth.

7. The spring $h$, connected adjustably to the rod J, for the purpose specified.

8. The combination of the shafts, having a spring-connection with the body, and one or more springs, L, constituting supplementary spring-bearings for the shafts, substantially as set forth.

9. The combination of the sulky-body, axle, and springs coiled round and attached to the axle and at both the ends to the body, as specified.

In testimony whereof I have signed my name to this specification in the presence of two subscribing witnesses.

FRANCIS L. PERRY.

Witnesses:
 BARNARD VOSBURG,
 ABRAM B. LEVY.